United States Patent [19]

Iyer et al.

[11] Patent Number: 4,927,985
[45] Date of Patent: May 22, 1990

[54] CRYOGENIC CONDUCTOR

[75] Inventors: Natraj C. Iyer, Monroeville; Walter J. Carr, Jr., Wilkins Twp., Allegheny County; Alan T. Male, Murrysville, all of Pa.

[73] Assignee: Westinghouse Electric Corp., Pittsburgh, Pa.

[21] Appl. No.: 231,040

[22] Filed: Aug. 12, 1988

[51] Int. Cl.$^5$ .............................................. H01B 12/00
[52] U.S. Cl. .............................. 174/125.1; 174/15.5; 505/884; 505/886; 505/887
[58] Field of Search ......................... 174/125.1, 15.5; 505/884, 886, 887

[56] References Cited

U.S. PATENT DOCUMENTS

| | | | |
|---|---|---|---|
| 3,327,370 | 6/1967 | Cohen | 29/155.5 |
| 3,428,925 | 2/1969 | Bogner et al. | 335/216 |
| 3,509,622 | 5/1970 | Bernert et al. | 29/599 |
| 3,527,873 | 9/1970 | Brechna et al. | 174/15.5 |
| 3,614,301 | 10/1971 | Royet | 174/125.1 X |
| 3,618,205 | 11/1971 | Barber et al. | 29/599 |
| 3,662,093 | 5/1972 | Wilson et al. | 174/125.1 |
| 3,710,000 | 1/1973 | Shattes et al. | 174/125.1 |
| 3,730,967 | 5/1973 | Nicol | 174/125.1 |
| 3,778,895 | 12/1973 | Nomura et al. | 174/125.1 X |
| 3,876,473 | 4/1975 | McDougall | 148/11.5 R |
| 4,028,488 | 6/1977 | McDougall | 174/125.1 |
| 4,079,187 | 3/1978 | Fillunger et al. | 174/155 |
| 4,079,192 | 3/1978 | Josse | 174/126.2 |
| 4,109,374 | 8/1978 | Whetstone et al. | 29/599 |
| 4,242,536 | 12/1980 | Young | 174/125.1 |
| 4,285,120 | 8/1981 | Nomura et al. | 174/125.1 X |
| 4,330,347 | 5/1982 | Hirayama et al. | 174/125.1 X |
| 4,411,959 | 10/1983 | Braginski | 428/558 |
| 4,421,946 | 12/1983 | Furuto et al. | 174/125.1 |
| 4,554,407 | 11/1985 | Ceresara | 174/125.1 |
| 4,652,697 | 3/1987 | Ando | 174/125.1 |
| 4,743,713 | 5/1988 | Scanlan | 174/125.1 |
| 4,791,241 | 12/1988 | Ando et al. | 174/125.1 |

FOREIGN PATENT DOCUMENTS 2826810 12/1979 Fed. Rep. of Germany ... 174/125.1
1167054 10/1969 United Kingdom ............... 174/15.5

OTHER PUBLICATIONS

Lazarer, B. G., et al., Superconductivity of Berylium and its Low-Temperature Polymorphism; Letters to the Editor JETP; Jul. 7, 1959; J. Exptl. Theoret. Phys., (U.S.S.R.) 37, 1461–1463; Nov. 1959.

Primary Examiner—Morris H. Nimmo
Attorney, Agent, or Firm—Stanley R. Bramham

[57] ABSTRACT

A composite hyperconductor for use at cryogenic temperatures and particularly well suited for AC applications employs at least one filament of conductor having an extremely low electrical resistance at cryogenic temperatures, a strengthening matrix surrounding the conductor, and a barrier for electrically insulating the conductor from the matrix while providing for efficient heat transfer therebetween and/or serving as a diffusion barrier to prevent contamination of the high purity conductor during processing. The preferred composite hyperconductor for space applications comprises an ultra high purity aluminum conducting filament, a aluminum alloy matrix and a boron nitride barrier.

23 Claims, 2 Drawing Sheets

CRYOGENIC CONDUCTOR

FIELD OF INVENTION

The invention relates to a cryogenic conductor particularly useful for AC applications and, more particularly, to a lightweight composite hyperconductor which resists eddy current losses.

BACKGROUND

Superconductors conduct electricity with essentially no resistance below certain cryogenic temperatures, maximizing electrical efficiency. However, superconductors currently available for commercial application do not become superconducting until they have been cooled to temperatures near absolute zero, requiring an expensive and complicated helium refrigeration system. A helium refrigeration system can be used to provide cooling to about 4.2 K., which is the boiling point of helium. Also, due to the deformation characteristics of these superconductors, primarily niobium-titanium and niobium-tin alloys, the manufacture of superconducting wires or cables is difficult and expensive.

Certain high purity metals, which will be referred to hereafter as hyperconductors, exhibit exceptionally low electrical resistance at higher cryogenic temperatures which can be achieved with a liquid hydrogen refrigeration system. A liquid hydrogen cooling system can be used to provide cooling to about 20.3 K., the boiling point of liquid hydrogen. These materials are ideal candidates for space applications since liquid hydrogen is used as a propellant in spacecraft. The term hyperconductor refers to materials with very high (on the order of 5000 or greater) residual resistivity ratios (the ratio of bulk electrical resistivity at room temperature to that at 4.2 K.) and high Debye temperatures. A material with a high residual resistivity ratio generally has an exceptionally low residual resistivity at 4.2 K., with high purity metals having the lowest residual resistivities. The Debye temperature determines the rate at which resistivity increases with temperature from the residual resistivity at 4.2 K. The resistivity of metals with low Debye temperatures increases rapidly with temperature resulting in a relatively high resistivity at temperatures only slightly above the liquid helium boiling point of 4.2 K. However, preferred materials for use as hyperconductors have a high Debye temperature and their resistance increases gradually as the temperature increases from 4.2 K. such that their resistance at 20 K. remains extremely low.

The Debye temperature is an intrinsic property of a metal, i.e., it is relatively independent of impurities or structural defects in the metal. The residual resistivity is an extrinsic property, i.e., it is a function of purity, defect structure, microstructure, etc. An extremely low residual resistivity requires an ultra high purity metal on the order of 99.999% (5N), 99.9999% (6N), or higher. Thus, while many metals exhibit a very low residual resistivity at 4.2 K. when they are processed to extremely high levels of purity, most of these metals have a low Debye temperature such that the rapid rise in resistivity with only slight deviations in temperatures upwardly from 4.2 K. remove these metals from consideration as candidates for commercial application as hyperconductors due to their high resistance at temperatures achievable with liquid hydrogen refrigeration systems (on the order of 20 K.).

Hyperconductors can be divided into three general classes. Firstly, there are the soft hyperconductors like cadmium, tin, sodium and indium, which have low residual resistivities, are easy to purify, but have low Debye temperatures, A second class is hard, brittle hyperconductors such as beryllium, ruthenium, and chromium. While these metals have very high Debye temperatures, the chemistry and metallurgy of these metals is such that it is very difficult to process them to the high purities required to achieve low residual resistivities. The most readily applicable class of hyperconductors is the group of hard, ductile hyperconductors which includes aluminum, magnesium, copper, calcium, and scandium.

Space power systems have created a new application for a conductor with an exceptionally low electrical resistivity at cryogenic temperatures achievable with a liquid hydrogen refrigeration system since liquid hydrogen is readily available in spacecraft due to its use as a propellant. The low residual resistivity at the currently achievable purity levels of aluminum and copper and their relatively high Debye temperatures make both aluminum and copper likely candidates for hyperconductor applications in space applications. While aluminum and copper at purities of 99% can be used as hyperconductors, higher purities, such as 99.999% and 99.9999%, are preferred. Significant work has been done on the chemical and metallurgical processing of ultrapure aluminum and copper. However, aluminum hyperconductor is particularly interesting due to its low weight and exceptional magneto-resistance.

Hyperconductor aluminum is of an extremely high purity, resulting in its mechanical strength being very low and requiring a strengthening mechanism. An obvious solution is the use of a strengthening matrix surrounding the hyperconductor. This arrangement, whereby the high purity aluminum is embedded in a matrix, is also advantageous in reducing eddy current losses in the conductor if the resulting conductor is twisted, and the matrix resistivity is sufficiently large. Application of conventional high strength aluminum alloys as the matrix result in contamination of the high purity aluminum during high thermal excursions experienced during processing. This contamination may be avoided to a great extent through the use of dispersion strengthened aluminum alloys. However, a significant disadvantage of using such an aluminum alloy matrix with an aluminum hyperconductor for alternating current applications is the low resistivity of these alloys and the resulting high AC transverse magnetic field loss. The eddy currents induced by a changing transverse magnetic field tend to flow along the axis of the conductor; but, if a mulifilament conductor is twisted, the induced current is forced to flow through the matrix. In particular, twisting of the filaments will result in a transverse component of induced current through the matrix, where most of the loss occurs. What is needed is a hyperconductor for AC applications which is lightweight and overcomes the transverse magnetic field loss due to circulating currents or eddy currents.

SUMMARY OF THE INVENTION

A composite cryogenic conductor comprising a cryogenic conducting filament for conducting electricity at cryogenic temperatures with a substantially lower electrical resistance than normally conductive conductors, a matrix surrounding the conducting filament for strengthening the composite conductor, and a barrier consisting of a barrier material having high electrical resistivity for electrically insulating the conducting filament from the matrix, and/or for preventing diffusion from the matrix into the conducting filament during high temperature processing of the composite conductor, the barrier having adequate thermal conductivity to enable the composite conductor to be uniformly cooled to cryogenic temperatures.

DESCRIPTION OF THE PREFERRED EMBODIMENTS

Figure 1:
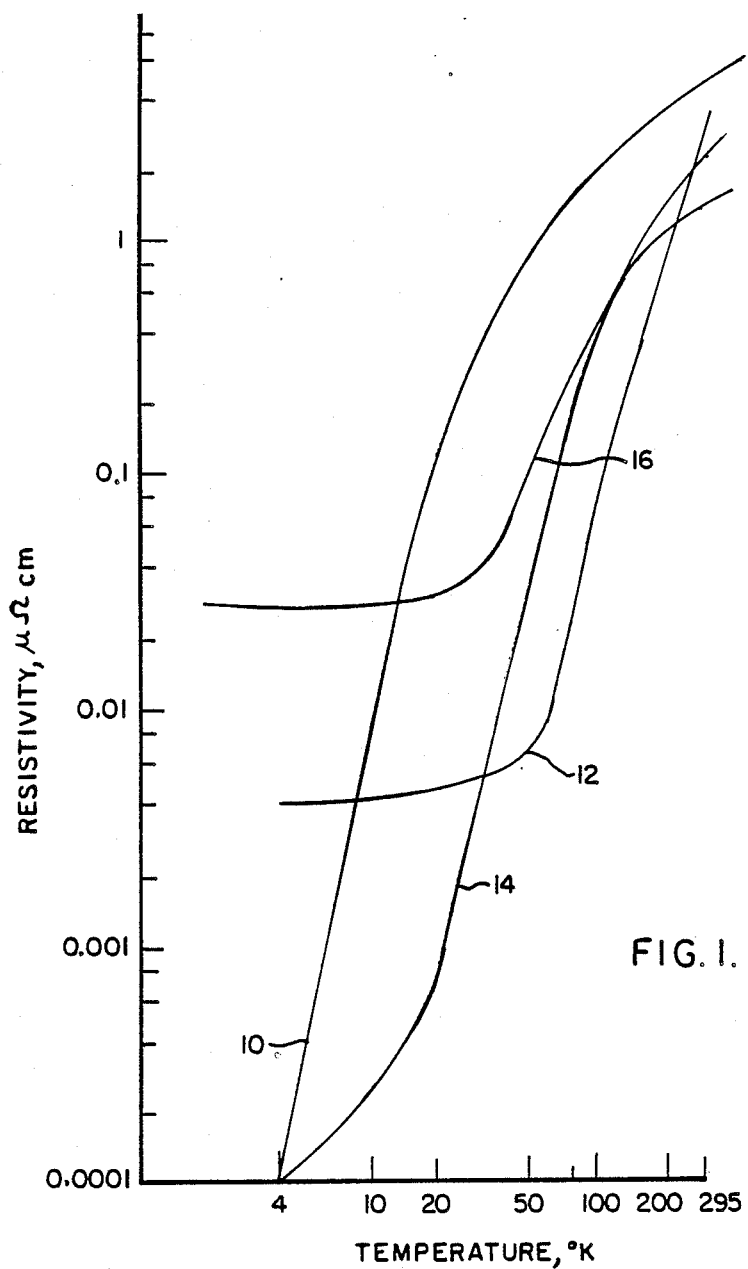
FIG. 1 is a graph of the electrical resistance of several high purity metals as a function of temperature at cryogenic temperatures near absolute zero.

FIG. 1 illustrates the electrical resistivity of several high purity metals at cryogenic temperatures. Since cadmium is easy to purify, extremely low residual resistivity can be achieved. However, cadmium has a very low Debye temperature (215 K.), causing its resistivity to rise rapidly with temperature as indicated by curve 10, making it useful as a crupgenic hyperconductor only at temperatures near 4 K. Due to formidable chemical and metallurgical problems, beryllium has not been processed to the high purity required to achieve low residual resistivity. Beryllium remains an attractive low temperature conductor due to its high Debye temperature (1370 K.) which results in a very slow increase in resistivity with temperature, as illustrated by curve 12.

Aluminum and copper each have a high Debye temperature (428 K. and 344 K. respectively) which results in a gradual increase in resistivity from 4 K. as represented by curve 14 for aluminum and by curve 16 for copper. Also, extensive work has been done on chemical and metallurgical processes for purification of aluminum and copper to ultrapure levels such that very low residual resistivity can be achieved. This combination of low residual resistivity with high Debye temperature makes aluminum and copper attractive materials for application as hyperconductors. However, for space applications, aluminum is preferred due to its light weight and excellent magneto resistance properties.

Figure 2:
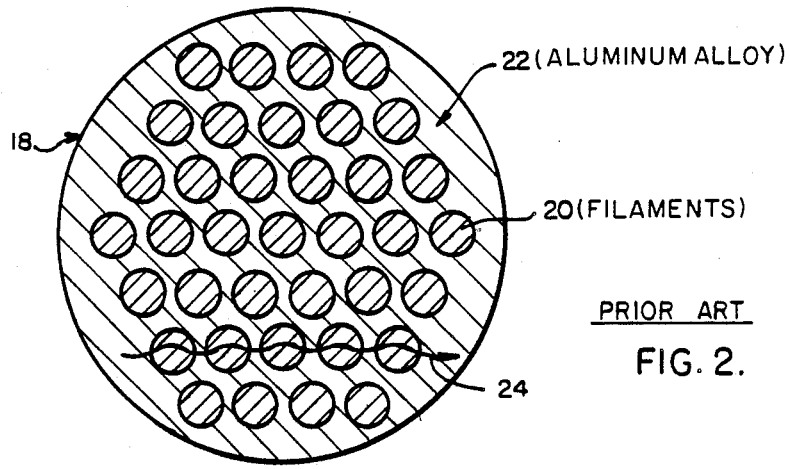
FIG. 2 is a transverse cross-sectional view of a prior art multifilamentary composite conductor.

FIG. 2 depicts a prior art multifilamentary composite hyperconductor 18 consisting of filaments 20 of high purity aluminum surrounded by a matrix 22 of an aluminum alloy, such as Al-Fe-Ce. If the filaments are twisted, transverse eddy currents 24 tend to flow across the matrix, causing a power loss and localized heating within the composite conductor. The increased temperature in the locations affected by the transverse current increases the resistance of the hyperconductor, reducing the efficiency of the composite conductor.

Figure 3:
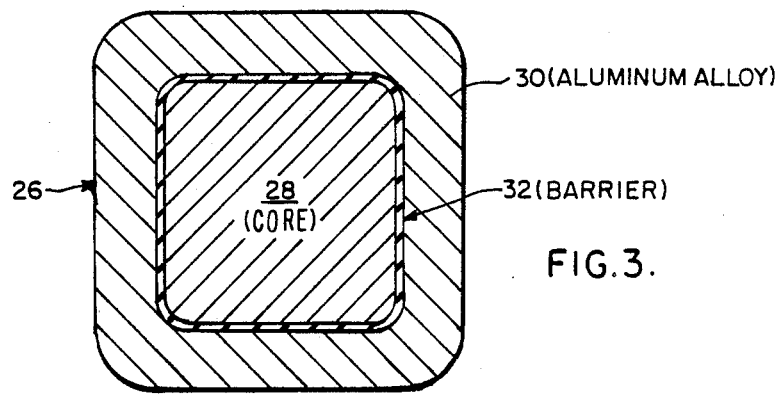
FIG. 3 is a transverse cross-sectional view of a single filament composite conductor according to the invention.

The composite hyperconductor 26 according to the invention is depicted in single filament form in FIG. 3. A core 28 formed of a hyperconductor such as high purity aluminum is surrounded by a matrix 30 of a strengthening material, such as an aluminum alloy. Disposed between the hyperconducting core and the matrix 30 is a barrier 32 of a material which prevents contamination of the core 28 by diffusion of elements from the matrix 30. Since the hyperconductor is preferably cooled to about 20 K., the barrier 32 must be formed from a material which is also an adequate thermal conductor for uniform cooling of the composite conductor. Also, most applications of the composite conductor require that the composite conductor be formed into a cable or wire. The barrier 32 must be formed from a material which will maintain its properties after high temperature processing of the composite hyperconductor through extrusion, rolling, or other cross sectional area reduction processes.

Conventional aluminum alloy matrices are relatively easy to process into wire. However, if the high purity aluminum hyperconductor is in contact with a conventional aluminum alloy matrix at the elevated temperatures required for cross sectional area reduction of the composite into a cable or wire, migration of elements from the alloy into the high purity core would contaminate the high purity core, increasing the residual resistivity of the core. While the use of dispersion strengthened aluminum alloys as the matrix would reduce the amount of contamination during processing, the ideal material for barrier 32 would also function as a diffusion barrier to prevent contamination of the high purity aluminum core while permitting use of conventional aluminum alloys as the matrix material.

Figure 4:
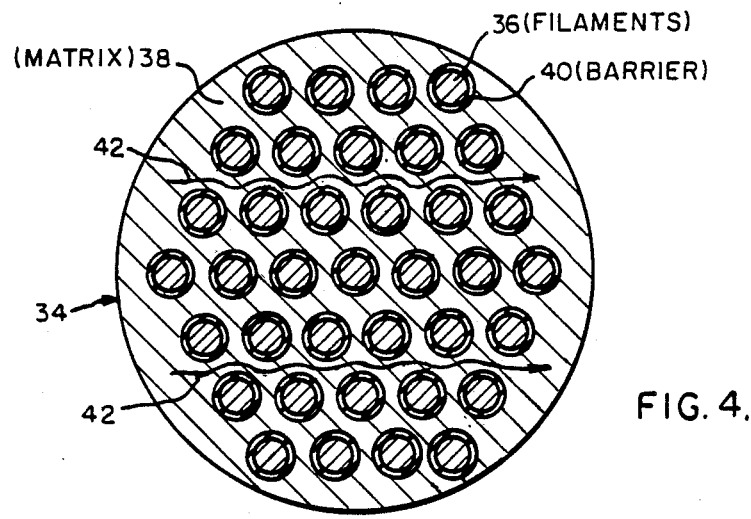
FIG. 4 is a transverse cross-sectional view of a multifilamentary composite conductor according to the invention.

FIG. 4 depicts, a preferred embodiment of a multifilamentary lightweight cryogenic conductor 34 consisting of filaments 36 of a hyperconducting material, preferably high purity aluminum. A matrix 38 provides strength for the composite to compensate for the low mechanical strength of the high purity aluminum filaments. A barrier 40 surrounds each of the filaments 36 and provides electrical insulation between the filaments 36 and the matrix 38 to prevent electrical shorting of the matrix by the filaments. The barrier 40 is preferably made from a material with high electrical resistivity, adequate thermal conductivity, and good co-processability with the aluminum alloy matrix and high purity aluminum filaments 36. The barrier material must maintain its properties through the high temperatures and reductions in area employed in reducing the composite conductor 34 into a cable or wire.

As seen in FIG. 2, when no barrier is present, the eddy currents 24 tend to flow through the filaments 20, increasing the magnitude of the current, causing larger loss in the matrix 22, and resulting in overall reduction of the efficiency of the composite conductor. As illustrated in FIG. 5, the high resistivity barrier 40 about each of the filaments electrically insulates the filaments from the matrix 38 and results in the transverse current 42 avoiding flow through the filaments 36. In the multifilamentary hyperconductor 34 according to the invention, the transverse resistivity is much larger than in prior art hyperconductors since the current does not pass through the high conductivity filaments 36 but instead continues through the relatively high resistivity matrix 38, reducing the losses in the composite conductor.

The transverse conductivity of the composite conductor 18 illustrated in FIG. 2 is approximated by the following equation:

$$\sigma \approx (1+\lambda)\sigma_m/(1-\lambda)$$

where $\sigma$ equals the transverse conductivity,

λ is the volume fraction of the high purity aluminum filament 20, and

σm is the conductivity of the matrix 22.

For the embodiment of FIG. 3, the transverse conductivity of the composite hyperconductor 34 is approximated by the following equation:

$$\sigma \approx (1-\lambda)\sigma_m/(1+\lambda)$$

By dividing the transverse conductivity of the composite conductor 34 which employs the electrically insulating barrier by the conductivity of the composite conductor 18 without a barrier yields a ratio of $(1-\lambda)^2/(1+\lambda)^2$. For a composite conductor having a 70% volume fraction of high purity aluminum filaments (λ equals 0.70), the ratio of the transverse conductivities of the conductor 34 having the barrier to that of the conductor 18 not having the barrier equals about 0.03. Therefore, the use of the barrier 40 about the filaments 36 results in a reduction in the transverse conductivity of the composite to about 3% of the conductivity without the barrier or, stated alternatively, results in an increase in the effective transverse resistivity of the matrix by a factor of 30. This means that for the same AC transport field loss, the radius of the strand can be increased by a factor of 5.48 (the square root of 30) and the amount of transport current it carries can be increased by a factor of 30.

As previously described, the optimum material for the barrier 40 would have excellent electrical insulating properties, i.e., a high electrical resistivity, a sufficiently high thermal conductivity, a poor diffusibility of matrix material elements to prevent filament contamination, i.e., good diffusion barrier characteristics, and good co-processability with the aluminum alloy matrix and high purity aluminum hyperconducting filament materials. The preferred material is boron nitride. Test composite conductors manufactured using a high purity aluminum core, (99.999% pure aluminum), a boron nitride barrier, and a high strength aluminum alloy matrix had a high residual resistivity ratio and sufficient thermal conductivity for cryogenic AC applications. The preferred thickness of the boron nitride barrier is 0.0002 inches.

It is contemplated that other materials can be employed for the barriers 32 and 40. Metallic materials, which would be co-processable with the aluminum alloy matrix and high purity aluminum filaments, could be employed so long as they do not contaminate the high purity aluminum conductive filaments. Ceramic materials other than boron nitride which have sufficiently high electrical resistivity, thermal conductivity and diffusion barrier characteristics can also be employed.

While high purity aluminum is preferred for use as the hyperconducting core material for space applications due to its light weight, high purity copper would work well as a hyperconductor with a boron nitride barrier material and a reinforcing matrix.

While preferred embodiments of the invention have been disclosed herein, many modifications thereof are possible. This invention should not be restricted except insofar as is necessitated by the spirit of the prior art.

We claim:

1. A lightweight composite hyperconductor which resists power and efficiency losses due to transverse eddy currents while conducting alternating current and comprises:

cryogenic conducting means in the form of a hard and ductile hyperconductor;

matrix means surrounding said conducting means and consisting essentially of a metal or alloy of higher strength than said conducting means; and barrier means disposed between said conducting means and said matrix means and consisting of a layer of barrier material of high electrical resistivity for electrically insulating said conducting means from said matrix means, preventing diffusing contamination of said conducting means from said matrix means and conducting heat between said matrix means and said conducting means to enable uniform cooling of said composite hyperconductor to cryogenic temperatures, said barrier material retaining these properties both during and after high temperature processing of said composite hyperconductor.

2. The composite hyperconductor of claim 1, wherein said conducting means is formed from a conductive material selected from the group consisting of aluminum, magnesium, copper, calcium, scandium and alloys thereof.

3. The composite hyperconductor according to claim 2 wherein said conductive material is at least 99% pure.

4. The composite hyperconductor according to claim 3 wherein said conductive material is aluminum.

5. The composite hyperconductor according to claim 4 wherein said barrier material consists essentially of boron nitride.

6. The composite hyperconductor according to claim 5 wherein said matrix means consists essentially of an aluminum alloy.

7. The composite hyperconductor according to claim 3 wherein the purity of said conductive material is at least 99.99%.

8. The composite hyperconductor according to claim 1 wherein said barrier material consists essentially of boron nitride.

9. The composite hyperconductor according to claim 1 wherein said conducting means consists essentially of aluminum of a purity of at least 99%.

10. The composite hyperconductor according to claim 1 wherein said conducting means consists essentially of copper of a purity of at least 99%.

11. The composite hyperconductor of claim 1, wherein the conducting means is in the form of a plurality of filaments each of which is surrounded by a layer of said barrier material between said filaments and said matrix means.

12. The composite hyperconductor of claim 11, wherein said layer of barrier material has a thickness of about 0.0002 inch.

13. A lightweight composite hyperconductor which resists power and efficiency losses due to transverse eddy currents while conducting alternating current and comprises:

a plurality of filaments of a cryogenic conducting material in the form of a hard and ductile conducting material;

matrix means disposed about said plurality of filaments and consisting essentially of a metal or alloy of higher strength than said hyperconductor;

a barrier layer surrounding each of said filaments between the latter and said matrix means and composed of a material of high electrical resistivity for electrically insulating said conducting material from said matrix means, preventing diffusing contamination of said conducting material from said matrix means and conducting heat between said matrix means and said conducting material to enable uniform cooling of said composite hyperconductor to cryogenic temperatures, said material of said barrier layer retaining these properties both during and after high temperature processing of said composite hyperconductor.

14. The composite hyperconductor of claim 13 wherein said hard and ductile hyperconductor is formed from a conductive material selected from the group consisting of aluminum, magnesium, copper, calcium, scandium and alloys thereof.

15. The composite hyperconductor of claim 14 wherein said layer of barrier material has a thickness of about 0.0002 inch.

16. The composite hyperconductor according to claim 14 wherein said conductive material is at least 99% pure.

17. The composite hyperconductor according to claim 16 wherein said conductive material is aluminum.

18. The composite hyperconductor according to claim 17 wherein said matrix means consists of a high strength aluminum alloy.

19. The composite hyperconductor according to claim 18 wherein said barrier material consists essentially of boron nitride.

20. The composite hyperconductor according to claim 16 wherein said conductive material is at least 99.99% pure.

21. The composite hyperconductor according to claim 13 wherein said barrier material consists essentially of boron nitride.

22. The composite hyperconductor according to claim 21 wherein said cryogenic conducting material is aluminum of a purity of at least 99%.

23. The composite hyperconductor according to claim 21 wherein said cryogenic conducting material is copper of a purity of at least 99%.

* * * * *